United States Patent [19]
Marra

[11] Patent Number: 5,373,922
[45] Date of Patent: Dec. 20, 1994

[54] TUNED MASS DAMPER FOR INTEGRALLY BLADED TURBINE ROTOR

[75] Inventor: John J. Marra, Jupiter, Fla.

[73] Assignee: The United States of America as represented by the Administrator of the National Aeronautics and Space Administration, Washington, D.C.

[21] Appl. No.: 134,443

[22] Filed: Oct. 12, 1993

[51] Int. Cl.⁵ ............................................. F16F 7/10
[52] U.S. Cl. .................................. 188/379; 416/144; 74/573 R; 74/574
[58] Field of Search .................. 188/378, 379, 296; 416/144, 219 R, 220 R; 74/574, 573 R; 301/6.91; 295/7; 181/207, 208, 209

[56] References Cited

U.S. PATENT DOCUMENTS

| | | | |
|---|---|---|---|
| 2,336,697 | 12/1943 | Moeller | 416/144 |
| 2,643,152 | 6/1953 | Brauer | 295/7 |
| 4,848,182 | 7/1989 | Novotny | 416/144 X |
| 5,257,909 | 11/1993 | Glynn et al. | 416/219 R X |

*Primary Examiner*—Robert J. Oberleitner
*Assistant Examiner*—Lee W. Young
*Attorney, Agent, or Firm*—Robert L. Broad, Jr.; Guy M. Miller; Alan J. Kennedy

[57] ABSTRACT

The invention is directed to a damper ring for damping the natural vibration of the rotor blades of an integrally bladed rocket turbine rotor. The invention consists of an integral damper ring which is fixed to the underside of the rotor blade platform of a turbine rotor. The damper ring includes integral supports which extend radially outwardly therefrom. The supports are located adjacent the base portion and directly under each blade of the rotor. Vibration damping is accomplished by action of tuned mass damper beams attached at each end to the supports. These beams vibrate at a predetermined frequency during operation. The vibration of the beams enforce a local node of zero vibratory amplitude at the interface between the supports and the beam. The vibration of the beams create forces upon the supports which forces are transmitted through the rotor blade mounting platform to the base of each rotor blade. When these forces attain a predetermined design frequency and magnitude and are directed to the base of the rotor blades, vibration of the rotor blades is effectively counteracted.

9 Claims, 2 Drawing Sheets

TUNED MASS DAMPER FOR INTEGRALLY BLADED TURBINE ROTOR

ORIGIN OF THE INVENTION

This invention was made with government support under contract NAS8-40000 awarded by the National Aeronautics and Space Administration. The Government has certain rights in this invention.

BACKGROUND OF THE INVENTION

1. Field of the Invention

This invention relates generally to rocket turbine rotors and specifically to an improved device for damping rotor blade vibration in integrally bladed rocket turbine rotors.

2. Description of Related Art

In one existing design, the blades of a rocket turbine rotor are separate elements which are attached to the rotor by insertion into machined slots. The rotor includes individual vibration dampers adapted for engagement with each rotor blade. These dampers dissipate energy via sliding action which takes place between the damper and the rotor. In this design, the rotor blades have extended necks to insure adequate motion at the damper.

More recently designed turbine rotors are typically, formed from solid rings having integrally mounted blades. This advance has provided more cost effective and dependable rotors. However, in known designs having an integrally bladed turbine rotor, the vibration dampers utilized continue to be formed of individual elements for damping the vibration of each blade. These elements are retained by complex machined mechanical connections. Consequently, such damper devices are quite costly. In addition, design of the rotor blades is often compromised to reduce vibration. Also, the structural integrity of a high speed rotor combining a large number of mechanically connected independent elements is inherently suspect.

SUMMARY OF THE INVENTION

The present invention is directed to a damper ring for effectively damping the natural vibration of the rotor blades of an integrally bladed rocket turbine rotor. The invention consists of an integral ring which is fixed to the blade platform of the rotor in a manner which in no way compromises the design of the rotor. The damper ring includes a series of circumferentially spaced apart supports which extend radially outwardly therefrom. Each support is adapted for precise location under each rotor blade and for rigid attachment to the rotor. The vibration damping of the rotor blades is accomplished by tuned mass damper beams, each of which is positioned between and attached at opposite ends to adjacent supports. These tuned mass damper beams are designed to vibrate at a predetermined frequency during operation of the rotor. The vibration of these beams enforce a local node of zero vibratory amplitude at the interface between the supports and the beam. The vibration of each beam creates predetermined forces upon the supports to which the beam is attached. Through the rigid attachment of the supports to the rotor, these forces are transmitted to the rotor blades. When the frequency and magnitude of these forces created by the damper ring reach the operating design criteria as required for a given rotor, vibration of the rotor blades is effectively counteracted. Given the unique basic design configuration as set forth in this application, this damper ring configuration may be optimized for application to a given turbine rotor by use of design techniques and mathematical analysis which are within the skill of the art.

It will be readily appreciated that the unique unitary configuration of the damper unit provides an effective rotor blade damper which is less expensive to manufacture than previous designs. More importantly, the device provides a level of reliability heretofore unachievable in this technology.

Current rocket turbine rotor technology efforts are focused on low cost, robust design. However, no known rotor damping device, existing prior to this invention, has satisfactorily met these requirements. Moreover, development and use of the integrally bladed turbine rotor has been hindered because of the complexity and cost of previous vibration dampers, and because the design of such rotors have been compromised as efforts were made to minimize vibration.

It is therefore an object of this invention to overcome the shortcomings of the damping devices of previous rocket turbine rotors and to provide a low cost robust damper which will enable further advancement in the design of rocket turbine rotors without the hindrance of adapting the rotor for use with antiquated damper devices.

DESCRIPTION OF THE PREFERRED EMBODIMENT

Figure 2:
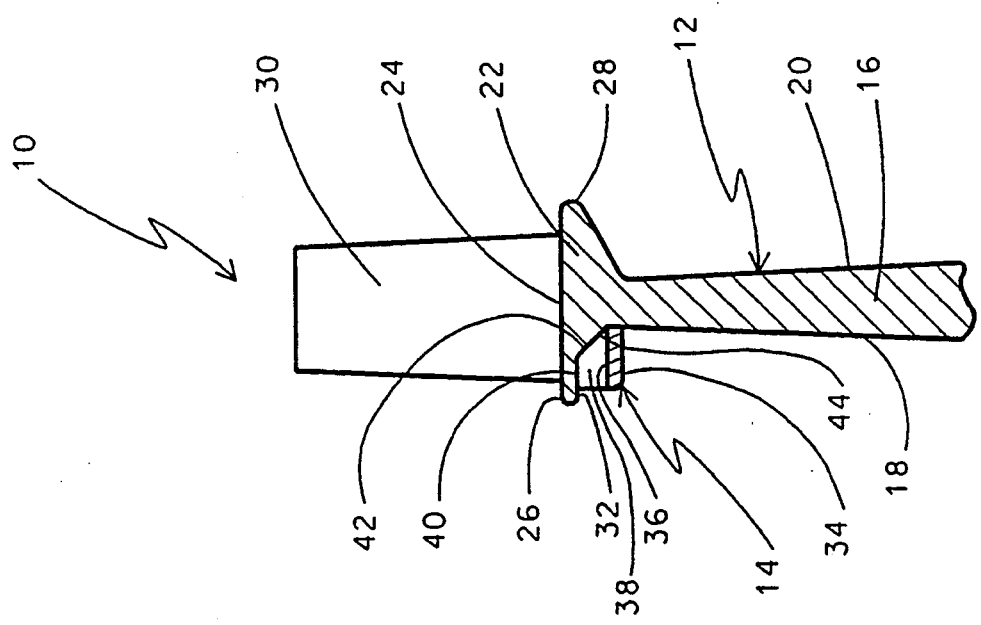
FIG. 2 is a sectional view taken along the section line 2—2 of FIG. 1.
Figure 1:
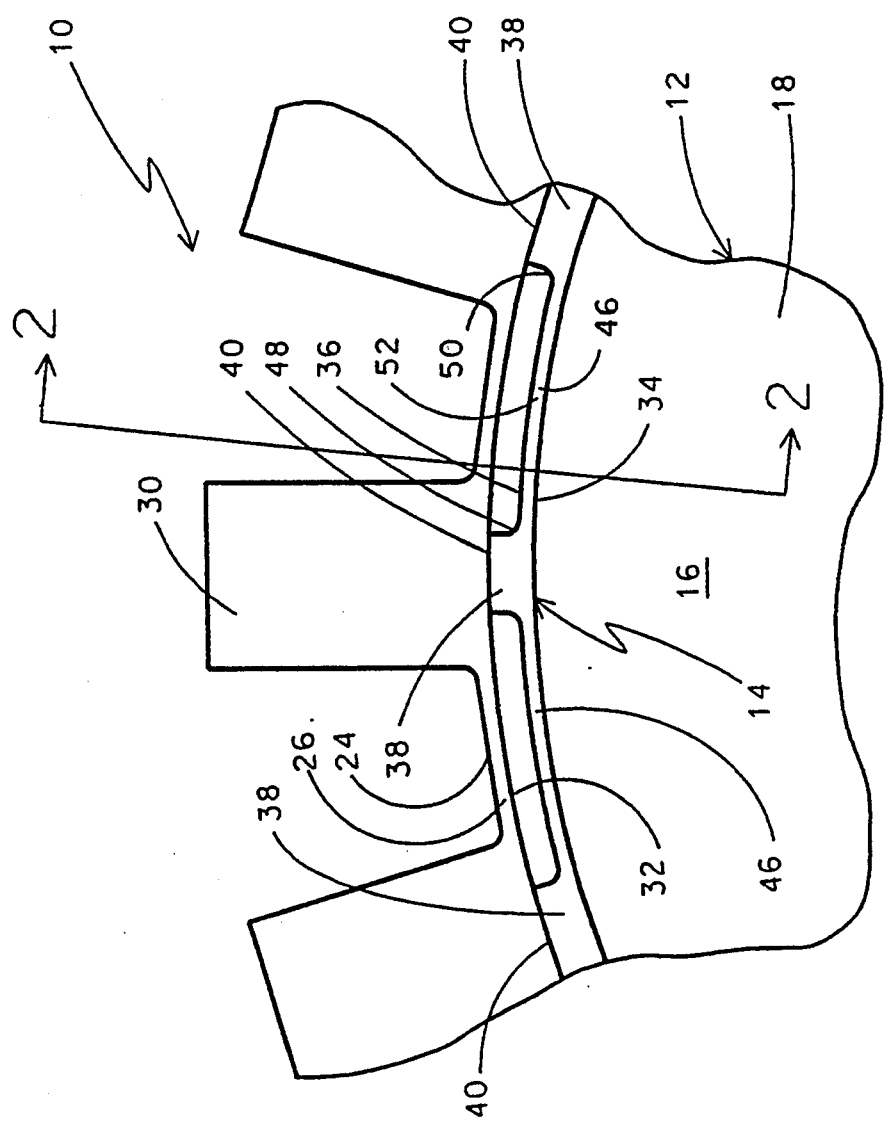
FIG. 1 is an elevational view of a radially outer portion of a rocket motor turbine rotor illustrating the attachment of a vibration damper ring thereto.
Figure 3:
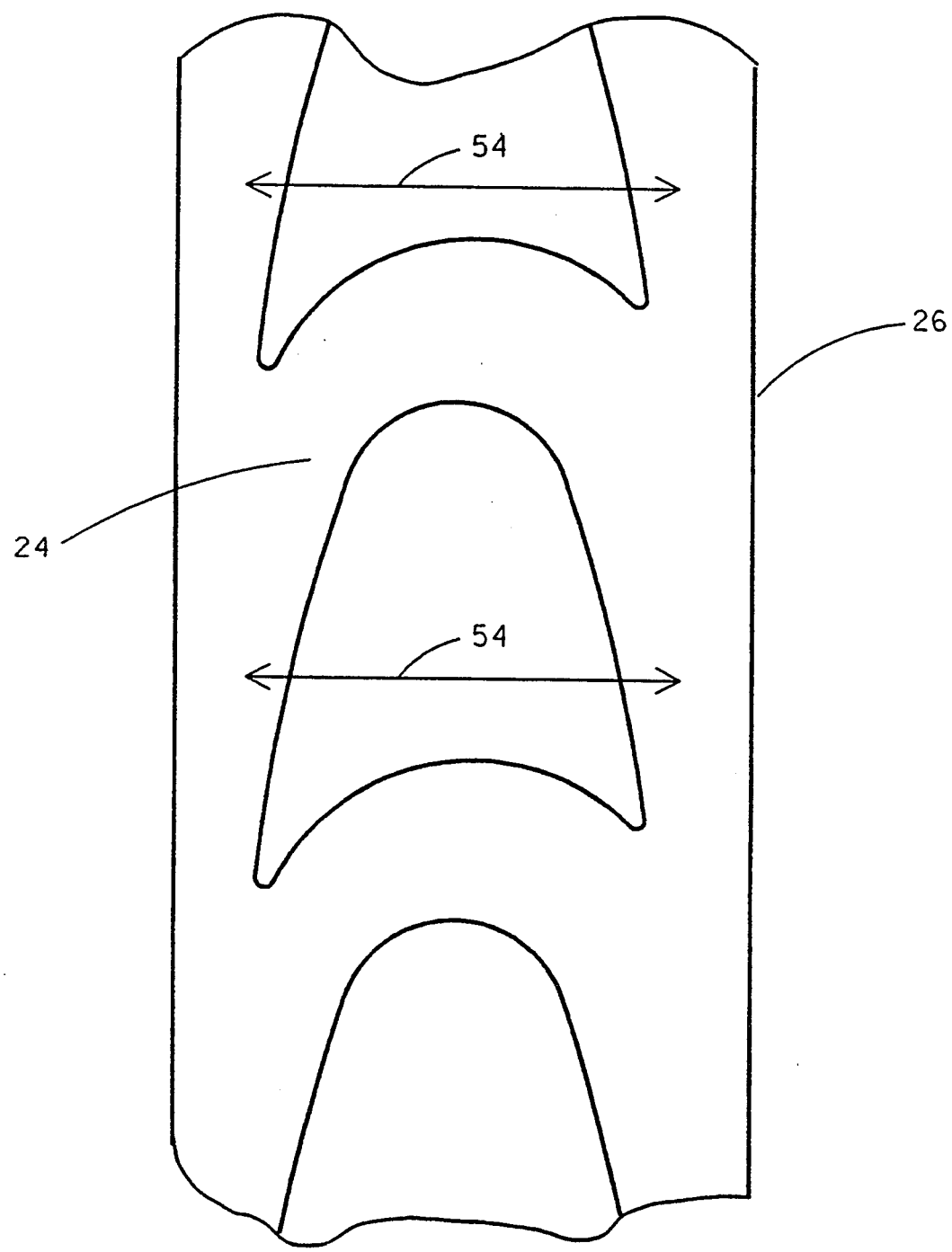
FIG. 3 is a an illustration of the rotor of FIG. 1 as viewed from above.

Referring now to FIG. 1 of the drawings, a rotor assembly is referred to generally by the numeral 10. The rotor assembly 10 includes a rotor referred to generally by the numeral 12, and a damping ring referred to generally by the numeral 14. The rotor 12 and the damping ring 14 each are unitary components, and each includes integral elements, the functions of which will be described in detail hereinafter. As best illustrated in FIG. 2, the rotor 12 includes a disk 16 which extends radially inwardly for attachment to a turbine shaft (not shown) in a conventional manner. Disk sides 18 and 20 define the lateral configuration of the disk 16. An elongated platform 22 is formed at the radially outer end of the disk 16. The platform 22 includes a mounting face 24 and a pair of lateral extensions 26 and 28, each of which extends laterally beyond the disk sides 18 and 20 respectively. A series of circumferentially spaced apart rotor blades 30 extend radially outwardly from the mounting face 24 of the platform 22. A receptor surface 32 is formed on the radially inner portion of the lateral extension 26 for interface with the damper ring 14 in a manner to be described hereinafter. The damper ring 14 is defined by a radially inner surface 34 and a radially outer surface 36, the latter of which is interrupted by the formation of a series of circumferentially spaced apart supports 38. The center of mass of each of the supports 38 is positioned precisely under the center of mass of each of the rotor blades 30. A mounting surface 40 is formed on the radially outermost portion of each support 38. These surfaces are adapted for a pressure fit within the receptor surface 32 of the platform extension 26. Typically the fit required to properly attach the damper ring 14 to the rotor 12 is accomplished by a standard pressure fit procedure which involves cold shrinking the damper ring before its insertion into the extension 26 for its ultimate pressure fitting interface with the receptor surface 32. This pressure fit of the ring to the receptor surface 32 on the underside of the rotor platform 22, allows centrifugal forces to be carried by the rotor with no need to compromise the rotor blade design in an effort to avoid vibration. This pressure fit mounting also contributes substantially to the achievement of a primary objective of the damper ring which is to reduce potentially destructive vibratory stress in the highly stressed rotor blades 30 and transfer it to the damper ring 14, which is designed to withstand the stress. Each of the supports 38 is contoured as at 42 to match approximately the configuration of a fillet 44 which is formed at the juncture of the disk 16 and the platform 22. Thus, it is noted that the ring is easily modified for use on rotors of varying configurations. A series of tuned mass damper beams 46 located intermediate adjacent supports 38 are connected at ends 48 and 50 to the supports 38. As will be described in further detail hereinafter, the tuned mass damper beam 46 is designed to undergo a maximum deflection at its unsupported intermediate portion 52, and to deflect about beam ends 48 and 50 during rotor operation. The ends 48 and 50 thus become the nodes of the beam deflection. This deflection occurs as a result of vibration which occurs in the rotor during normal operation. For maximum design efficiency the mass of the tuned mass damper beam 46 should be kept to a minimum. Referring now to FIG. 3, the arrangement of the blades 30 upon the face 24 of the platform 22 is illustrated in this top view of the rotor assembly 10. A directional line 54 which passes through the rotor blades 30 illustrates the direction of the fundamental bending mode at a typical vibration frequency.

During operation, the rotor blades 30 vibrate at a known deflection and frequency under given parameters of operation. To minimize this vibration the tuned mass damper beam 46 is designed of a mass and configuration such that it will vibrate at a frequency which creates forces upon the supports 38. These forces are established to oppose forces created by the vibrating rotor blade and are transmitted through the platform 28 to the rotor blades 30 to counteract the blade vibration.

In the design of this damper ring, it is pointed out that, while the basic design configuration and its specific application to the damping of rotor blade vibration is unique, the mathematics involved in optimizing the final design of a damping ring for minimizing the blade vibration on a given rotor is within the skill of the art. In this regard, attention is directed to a well known reference book titled "SHOCK AND VIBRATION HAND BOOK" (by Cyril Harris and Charles E. Crede, McGraw Hill published 1976) chapters 6 and 28.

Obviously, numerous modifications and variations of the present invention are possible in light of the above teachings. It is therefore to be understood that within the scope of the appended claims the invention may be practiced otherwise than as specifically described herein.

I claim:

1. A vibration damper adapted for attachment to a rotating mechanism, for counteracting vibration in said rotating mechanism; said vibration damper comprising:
   a series of spaced apart supports adapted for rigid attachment to said rotating mechanism;
   a series of tuned mass damping beams; each of said beams being attached at one end thereof to one of said supports and at the opposite end thereof to another of said supports whereby the vibration in said rotating mechanism is counteracted by the vibration of said tuned mass damping beams during attached relationship between said vibration damper and said rotating mechanism.

2. A vibration damper as set forth in claim 1, wherein said supports and said tuned mass damping beams are integral with one another.

3. A vibration damper as set forth in claim 2 wherein said supports and said tuned mass damping beams are configured as a ring.

4. A vibration damper adapted for attachment to a rotating mechanism for damping vibration in said rotating mechanism, said rotating mechanism including spaced apart components which vibrate at known deflection and frequency under given parameters of operation; said vibration damper comprising:
   a series of spaced apart supports adapted for rigid attachment to each of said components;
   a series of tuned damping beams, each of said beams having first and second ends, and being positioned intermediate a pair of said spaced apart supports, and being attached at said first end to one support of said pair of spaced apart supports and at said second end to the other support of said pair of spaced apart supports, and being adapted to vibrate said spaced apart supports within predetermined parameters so as to counteract the vibration of said components of said rotating mechanism when said vibration damper and said rotating mechanism are in attached relation.

5. A vibration damper for attachment to a turbine rotor assembly; said vibration damper comprising:
   a ring;
   said ring including a series of supports extending radially outwardly therefrom and being adapted for rigid attachment to said turbine rotor assembly;
   a series of tuned mass damper beams, each of said tuned mass damper beams being located intermediate and connecting at opposite ends thereof to one of said supports, and being configured to deflect intermediate the ends thereof, and adapted to vibrate in opposition to the vibration of said turbine rotor assembly so as to dampen the vibration of said turbine rotor assembly when said vibration damper and said turbine rotor assembly are in attached relationship during operation of said turbine rotor assembly.

6. A vibration damper as set forth in claim 5 wherein said supports and said mass damper beams of said ring are integral with one another.

7. In a turbine rotor assembly having a rotor blade platform formed at the radially outer end thereof, a series of radially extending circumferentially spaced apart rotor blades extending from the radially outer surface of said rotor blade platform, said rotor blade platform having lateral extensions extending one on each side of said disk, and wherein said rotor blades vibrate at known deflection and frequency under given parameters of operation; a vibration damper ring for attachment to said turbine rotor assembly, said vibration damper ring comprising:
- a radially inner surface and a radially outer surface;
- a series of supports extending radially outwardly from said radially outer surface, said supports being adapted for rigid attachment to one of said lateral extensions of said turbine rotor assembly;
- a series of tuned mass damper beams, each being located intermediate and integrally connecting at opposite ends thereof to one of said supports, and being configured to deflect intermediate the ends thereof with a magnitude and frequency sufficient to apply predetermined forces to said supports, which forces are effective to counteract the vibration of the rotor blades of the turbine rotor assembly during operation, when said damper ring and said turbine rotor assembly are in attached relation.

8. A vibration damper as set forth in claim 7 wherein each of said supports is positioned radially under at least a portion of one of said rotor blades, and wherein the center of mass of said support is in radial alignment with the center of mass of said rotor blade.

9. A vibration damper as set forth in claim 8 wherein said supports include radially outer mounting surfaces adapted for a pressure fit in compliance with the radially inner surface of one of said lateral extensions of said rotor blade platform to provide said rigid attachment of said supports to one of said lateral extensions of said turbine rotor assembly.

* * * * *